US008705119B2

(12) United States Patent
Bonikowski et al.

(10) Patent No.: US 8,705,119 B2
(45) Date of Patent: Apr. 22, 2014

(54) APPLICATIONS, SYSTEMS AND METHODS FOR IDENTIFYING AND MONITORING CRITICAL COLORS IN CUSTOMER PRINT JOBS

(75) Inventors: Gregg A. Bonikowski, Rochester, NY (US); Suraj Kumar, Webster, NY (US); Kenneth C. Byrne, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1098 days.

(21) Appl. No.: 12/194,367

(22) Filed: Aug. 19, 2008

(65) Prior Publication Data

US 2010/0046013 A1 Feb. 25, 2010

(51) Int. Cl.
*G06F 15/00* (2006.01)
*G06K 1/00* (2006.01)

(52) U.S. Cl.
USPC ............. 358/1.9; 358/2.1; 358/1.18; 358/1.1; 358/1.11; 358/1.12; 382/205; 382/232

(58) Field of Classification Search
USPC ................. 358/1.9, 2.1, 1.18, 1.1, 1.11–1.14; 382/205, 232
See application file for complete search history.

(56) References Cited

U.S. PATENT DOCUMENTS

| | | | | |
|---|---|---|---|---|
| 5,450,165 | A | 9/1995 | Henderson | |
| 6,175,700 | B1 | 1/2001 | Miller et al. | |
| 6,351,308 | B1 | 2/2002 | Mestha | |
| 6,384,918 | B1 | 5/2002 | Hubble, III et al. | |
| 6,446,100 | B1 | 9/2002 | Warmus et al. | |
| 6,621,576 | B2 | 9/2003 | Tandon et al. | |
| 6,639,669 | B2 | 10/2003 | Hubble, III et al. | |
| 6,975,949 | B2 | 12/2005 | Mestha et al. | |
| 7,024,152 | B2 | 4/2006 | Lofthus et al. | |
| 7,069,164 | B2 | 6/2006 | Viturro et al. | |
| 7,110,143 | B2 * | 9/2006 | Bares et al. | 358/2.1 |
| 7,136,616 | B2 | 11/2006 | Mandel et al. | |
| 7,161,719 | B2 | 1/2007 | Wu et al. | |
| 7,206,532 | B2 | 4/2007 | Lofthus et al. | |
| 7,307,752 | B1 | 12/2007 | Mestha et al. | |
| 2002/0093684 | A1 | 7/2002 | Bares et al. | |
| 2004/0205629 | A1 * | 10/2004 | Rosenholtz et al. | 715/526 |
| 2004/0227964 | A1 | 11/2004 | Fujino | |
| 2006/0098233 | A1 * | 5/2006 | Jodra et al. | 358/3.26 |
| 2006/0110009 | A1 | 5/2006 | Klassen et al. | |

(Continued)

OTHER PUBLICATIONS

None, “HP Redefines Colour and Workflow Management Industry’s First Embedded Spectrophotometer,” Oct. 25, 2006, HP Graphic Arts web page, obtained from Internet on Apr. 21, 2008, 2 pp.

(Continued)

*Primary Examiner* — Quang N Vo
(74) *Attorney, Agent, or Firm* — Pillsbury Winthrop Shaw Pittman, LLP

(57) ABSTRACT

Applications, systems and methods for identifying and monitoring critical colors in a print job and using an embedded color sensing device to measure critical color printed actually printed. The application permits the user to interact with a print job and to select of one or more critical colors from within the print job. In one embodiment, an application is configured to provide a graphical user interface (GUI) to facilitate the user in selecting critical colors. A printing system and method are disclosed for automatically monitoring critical colors in a print job and using an embedded color sensing device to measure critical color printed.

22 Claims, 9 Drawing Sheets

(56) References Cited

U.S. PATENT DOCUMENTS

| | | | |
|---|---|---|---|
| 2006/0244968 | A1 | 11/2006 | Mestha et al. |
| 2007/0139671 | A1 | 6/2007 | Stevens |
| 2007/0139734 | A1 | 6/2007 | Fan et al. |
| 2008/0043263 | A1 | 2/2008 | Hancock et al. |
| 2008/0050133 | A1 | 2/2008 | Adiletta |

OTHER PUBLICATIONS

None, EasyRGB, Color Calculator, obtained from Internet on Aug. 7, 2008, 1 p.

None, "Spot Color," Wikipedia, obtained from Internet on Jul. 23, 2008, 3 pp.

* cited by examiner

APPLICATIONS, SYSTEMS AND METHODS FOR IDENTIFYING AND MONITORING CRITICAL COLORS IN CUSTOMER PRINT JOBS

FIELD

This application relates to applications, systems and method for identifying and monitoring critical colors in customer print jobs.

BACKGROUND

Rendering specific colors from color printing systems can vary over time, and sometimes within a single job. In addition, environmental conditions, such as humidity and temperature, greatly affect toner and a particular system's print capabilities. The degree to which a particular color can vary and still be acceptable can differ based on a number of factors, such as, for example, the requirements of the customer, the specific job being printed, the print shop handling the print job, the specific color being printed, etc. Print shops that require a high degree of color fidelity typically inspect the printed job output at some specified interval. These inspections are often visual, but may also include offline measurement devices. This can be a time-sensitive and costly process.

U.S. Pat. No. 6,175,700, herein incorporated by reference in its entirety, describes a method for printing test patterns that are interleaved in large print jobs. The disclosed method enables periodic sampling of colors while a job is printing, allowing the customer to monitor color quality during production. However, the customer must visually review (with the naked-eye) the printed sample test patterns, and stop the printing process to take remedial action, if necessary.

Some printing systems use inline measurements device, but these typically rely on color patterns that are trimmed from (or hidden from) the final customer document, such as on a photoreceptor belt, and therefore are not well-suited to document printers.

SUMMARY

According to one aspect of the application, a method for monitoring critical color quality for a printing system, is provided, comprising: selecting a print job; allowing a user to interact with specific areas of the print job and to select one or more critical colors within the print job to monitor during a print run; printing the print job including one or more pages with one or more of the user-selected critical color printed thereon; automatically measuring the one or more printed user-selected critical colors to determine the actual color or colors printed; and executing specific system action in response to the measuring.

According to another aspect of the application, a system for monitoring critical color quality for a printing system, is provided, comprising: an application for allowing a user to interact with specific areas of a print job and identifying one or more critical colors within the print job to monitor during a print run; a marking engine for printing the print job including one or more pages with one or more of the user-selected critical colors printed thereon; a color sensing device for automatically measuring the one or more printed user-selected critical colors to determine the actual color or colors printed; and a controller for executing specific action in response to a measurement of at least one printed critical color.

According to a further aspect of the application, a machine-readable storage medium having machine-implemented instructions, executable by a processor, for allowing a user to interact with specific areas of a print job and to monitor critical color quality for a printing system, is provided, comprising: a graphical user interface module for generating a graphical user interface (GUI) on a display device and to interact with specific areas of a print job; a preview module for presenting the user with preview images for the print job; a critical color selection module for receiving a selection from the user of one or more critical colors within the print job; a critical color module for maintaining information related to each of the critical colors; and an action response module for executing specific action in response to a measurement of at least one printed critical color.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

This application is related to subject matter similar to that disclosed in co-pending U.S. patent application Ser. No. 12/194,232, entitled "APPLICATIONS, SYSTEMS AND METHODS FOR IDENTIFYING AND MONITORING CRITICAL COLORS IN A PRINT JOB AND USING AN EMBEDDED COLOR SENSING DEVICE TO MEASURE CRITICAL COLOR TEST PATTERNS INSERTED IN THE PRINT JOB," filed Aug. 19, 2008, herein incorporated by reference in its entirety.

The terms "print," "printing," and/or "printed," as used herein may refer to printing on the output media of a printing device, as well as, printing or otherwise marking on one or more intermediate transfer members (e.g., photoreceptor belts, drums or other image bearing surface) of the printing device.

The terms "customer image, "customer print job"," and/or "customer document" as used herein may refer to images of print jobs as opposed to images for control patches, test patterns, and/or other diagnostic targets.

According to one aspect of the application, a user is allowed to interact with specific area of the print job and to select one or more critical colors from within a print job customer document. In one embodiment, an application is configured to provide a graphical user interface (GUI) to facilitate the user in selecting critical colors.

The term "critical color," as used herein, refers to a specific color within a print job which requires a high level of consistency. Critical colors may be identified by the customer and/or the print shop. For example, a customer may indicate to the print shop that the particular color is important (e.g., the color of a company's logo).

Moreover, the print shop may print or reprint a large print job using multiple machines (perhaps, even at multiple locations). Therefore, critical colors may be identified by the job shop or printer operator to ensure consistency among the machines, locations, and/or print runs.

Figure 1:
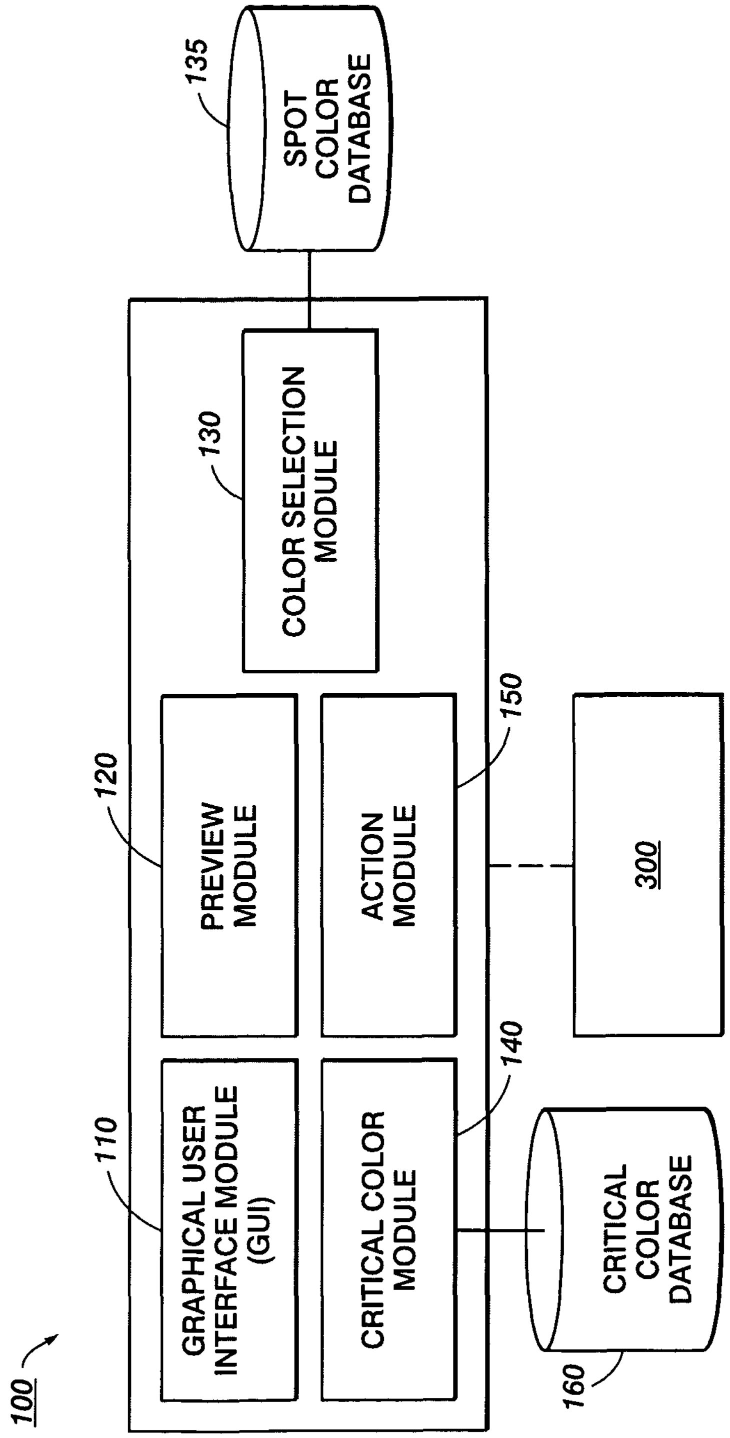
FIG. 1 shows an exemplary critical color-selection application, according to an embodiment of the application.

FIG. 1 shows an exemplary critical color-selection application 100 according to an embodiment of the application.

Figure 3:
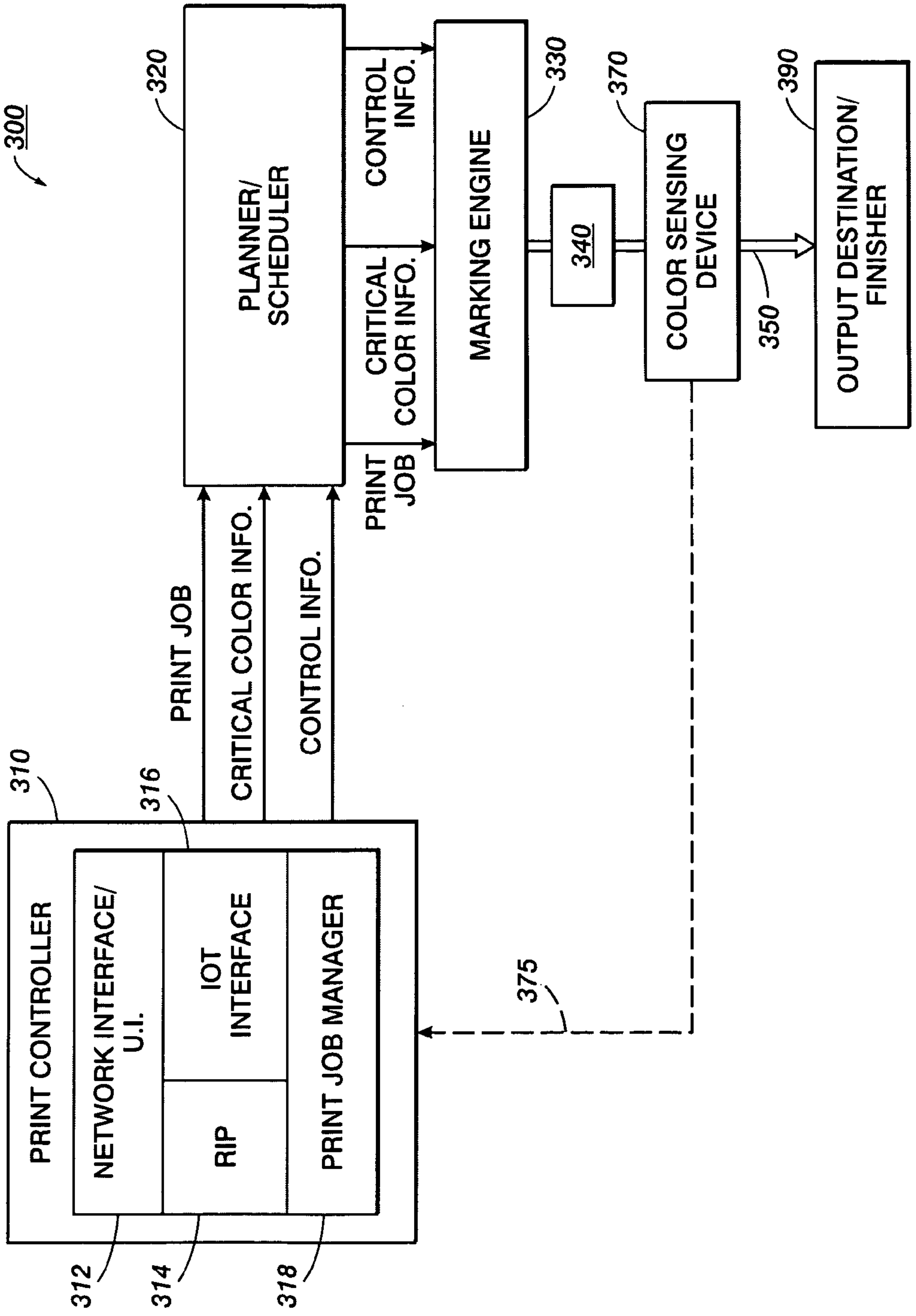
FIG. 3 shows an exemplary schematic for a printing system architecture, according to one embodiment of the application.

The application 100 may include a plurality of modules, including but not limited to, a graphical user interface module 110, a document preview module 120, a critical color selection module 130, a critical color module 140, and an action response module 150. One or more of the modules comprising application 100 may be combined. For some purposes, not all modules may be necessary. The application preferably interfaces with a printing system 300 (FIG. 3). Moreover, the application 100 may interface with one or more additional systems, such as a spot color database 135, and a critical color database 170.

According to one embodiment, the application 100 may be a software application created using any number of programming languages. Of course, it will be appreciated any number of hardware implementations, programming languages, and operating platforms may be used. As such, the description or recitation of any specific hardware implementation, programming language, and operating platform herein is exemplary only and should not be viewed as limiting.

The application 100 may be stored on a computer- or machine-readable storage media having computer or machine-executable instructions executable by a processor. In one implementation, the application 100 may reside on a memory of the print controller of a printing system or the printing system itself.

Alternatively, or additionally, the application 100 may be a stand-alone application running on a computer which interfaces with a printing system, for example, through a remote network connection, or via a computer readable storage media (i.e., flash memory, DVD/CD ROM, floppy disk, removable or permanent hard drive etc.). In some implementations, the application 100 may be a "plug-in" application that is incorporated into a third-party software application including, for example, document-processing or image production applications. Other configurations may be also implemented.

The graphical user interface module 110 is configured to generate a graphical user interface (GUI) on a display device and to control the various display and input/output (I/O) features of the application. The graphical user interface module 110 may generate display signals to the display device. In one implementation, it may provide one more "windows" or panes for displaying information to the user. The display device may include a cathode ray tube (CRT), liquid crystal display (LCD), plasma, or other display devices.

Moreover, the graphical user interface module 110 allows the user to interact with the application 100. For example, the graphical user interface module 110 may permit use and operation of one more of: a keyboard, keypad, touch-screen, mouse, joystick, light pen, or other peripheral devices for receiving inputs from a user. Similarly, the application may output information and data to the user, for example, via a printer or other peripheral device (e.g., external storage device or networked devices).

The graphical user interface module 110 may interact with a computer's operating system and/or one or more other software applications. In one implementation, application 100 may comprise a stand-alone software application running on a computer, printing system, or other machine. Alternatively, a server (not shown) may host the application 100, which may, in some implementations require a user to access the server over a network to use the application. In some implementations, a user may download the application 100 from a server, with program updates made available (over the network or the Internet) as needed, or on a predetermined, regularly-scheduled basis. The application 100 may be operated in a Microsoft Windows® operating environment. However, other operating systems and environments (e.g., UNIX, Linux, and proprietary systems, such as Apple Mac OS X) are also envisioned.

The preview module 120 is configured to allow the user to preview at least one print job on the display device. For example, the preview module 120 may be configured to access one or more print jobs from a print job manager of a print controller of a printing system. It will be appreciated that the application 100 may also handle other electronic documents similar to print jobs. The print jobs may be electronic files, which include various electronic documents to be printed. Exemplary files types may include various digital image and text files, such as PDF, DOC, TIFF, BMP, GIF, JPEG, and other common page description language (PDL) file and document formats, such as PPML, Adobe® Postscript®, VIPP, IPDS, LCDS, AFPDS, etc.

The user may "open" and "close" the print jobs in a conventional manner, for example, through the File option menu of the graphical user interface. According to one implementation, the preview module 120 may generate and display a plurality of "thumbnail" or smaller images corresponding to the pages of the print job.

The color selection module 130 provides the user with capabilities to select one or more critical colors within a print job. According to an aspect of the application, the user may select one or more points from within the print job. In response, the color selection module 130 determines a corresponding critical color for the point in the print job that the user selected. The user-selected points may be on the same page or spread amongst various pages within the print job. In a preferred implementation, the color selection module 130 determines for each selected point: the page number, the location of the selected point on the page, and color data related to the selected point. This information may be maintained using a critical color log.

Preferably, the color selection module 130 may use the input image data for a single pixel corresponding to the user-selected point. In other implementations, The color selection module 120 may look at a group of pixels, for example, in the area or vicinity (e.g., within a certain number of pixels) of a point selected by the user to determine the predominant color therein. In some implementation, weighing or averaging algorithms might be used.

The color selection module 130 may also be configured to recognize spot colors in response to a user-selected critical color. Spot colors are recognized or standardized colors, for example, according to an industry, proprietary, and/or organizational system. Some of the known spot color classification systems include: Pantone®, Toyo, DIC, American Newspaper Publishers Association (ANPA), and HKS. The color selection module 130 may interface with at least one spot color database 135, which store or maintains color palettes, libraries, collections, and/or other information regarding spot colors. Spot colors are usually called out as separate named colors in the input PDL.

According to one aspect of the application, the user can identify critical colors essentially anywhere in a print job, other than named spot colors, and monitor print quality for those selected colors. For example, the CYMK color data determined from the input image data for a user-selected critical color may be run through a spot color database 135 to find a match. The spot color database 135 may be located remotely from the application 100 and interfaced, for example, via a network. In one implementation, the application 100 may also permit users to create new spot color entries and save and edit entries in the spot color database 135. The spot color information data, from the spot color database 135, may advantageously provide additional and/or more pertinent information regarding the critical color than the input image data alone. Similarly, the spot colors information data more accurately define the critical color to be printed and/or better meet the expectations of the customer.

Based on the user's selection, either spot color information data or the input image data for the selected point will be used. In one implementation, if a selected color appears to be a spot color, then the color selection module 130 may prompt the user that the critical color is a spot color. For example, if the critical color matches a known spot color from one or more of the spot color databases 135, the color information related to that spot color may be used. In some implementations, this may be automatic. In other implementations, the user may be first prompted and given the option to select to use the spot color information data or the input image data corresponding to the critical color data.

The critical color module 140 permits a critical color information to be generated for a print job. The critical color information may be used for calibration and diagnostic purposes.

The critical color module 140 generates a digital file that may be saved and/or transmitted from one machine to another (or from one location to another, for example via a network). Once the critical color information has been generated, it can be saved in the critical color database 170. The critical colors, locations in the print job, target color values for the critical colors, and other control information, may be saved along with the print job, or saved separately from the print job. In some implementations, information or embedded code linking the print job and the critical color information may be incorporated into the print job, the critical color data files or both, for example, as meta-data.

Each color in the critical color data may have a color target value (e.g., specified in L*a*b color space). These target color values may be stored in the critical color database 170 along with critical colors, locations, target colors values, and control information Where these target color values are known by the printing system the known value is stored the critical color database 170. However, where a target color value is initially unspecified, a "null" target color value may be stored in the critical color database 170 and/or memory for that color.

For each critical color, the color sensing device reads the color corresponding to the location of the critical color, and the printing system will temporarily store the color value, for example, in a memory.

For each of the colors for which a target color value is known, the system compares the color read by the color sensing device to the target color value. Otherwise, in one implementation, target color values may be updated to use the values initially read by the color sensing device for that critical color.

On the other hand, if any of the critical colors measurements are outside the specified target values or other quality limits, then the user may be directed to perform maintenance operations to improve the output color, and/or to modify the color quality levels.

The action response module 150 is configured to permit the user to select various options for the printing system that may executed, for example, if the measured quality of the critical color(s) is outside specified target values or other quality limits. For example, the user may select to have the system alert the user, shutdown, and/or take corrective action.

For further discussion of the applications 100 and its functionality, reference will be made to the corresponding exemplary application screens shown in FIGS. 2 and 2A-2E. It will be appreciated that these figures represent only a few implementations of the application 100 and that many others are possible.

Figure 2:
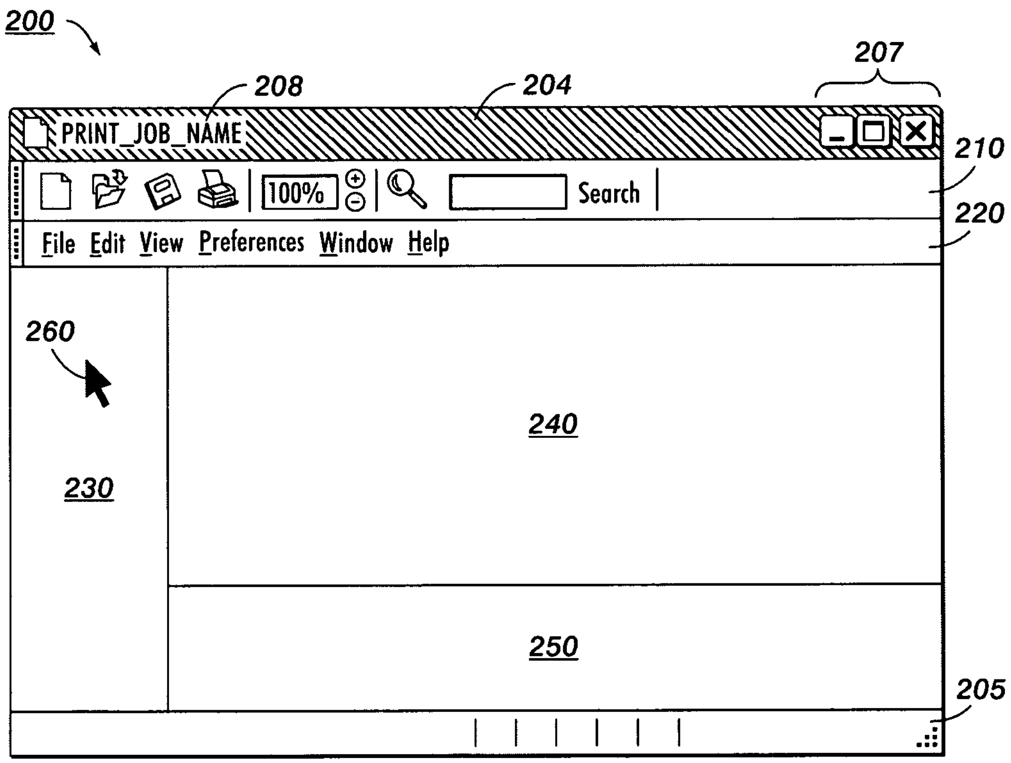
FIG. 2 shows an exemplary graphical user interface (GUI), in accordance with an embodiment of the application.

FIG. 2 shows, for example, an exemplary graphical user interface (GUI) 200, in accordance with an embodiment of the application. The graphical user interface 200 may be generated by the critical color selection application 100, discussed above.

The GUI 200 may be a window-like presentation defined by a top border 204 and a bottom border 205. Typical windows-like controls 207, including minimize, maximize and close functions, may be provided at the upper-right hand corner (or at other locations) of the top border 204.

The name of the print job 208 may be displayed at the top of the graphical user interface 200, for example, in the top border 204. A menu bar 210 and tool bar 220 may be provided just below the top border 204 (or at other locations). The menu bar 210 may include a number of option menus, for example, File options, Edit options, View options, Preferences options, and Window options, and Help options, etc. The tool bar 210 may include a number of features and options, such as shortcut features to create a new file, open a file, save a file, print a file, a zoom feature, a magnification features, and a search feature. Many of features and options of the menu bar 210 and/or tool bar 220 may be conventional and/or customizable to support aspects of the application 100.

The graphical user interface 200 may include one or more active windows or panes. In one implementation, three primary panes may be provided, including a preview pane 230, an active page pane 240, and a critical color pane 250. These will be discussed in more detail below. Other windows and panes may similarly be provided. Various mechanisms for minimizing, maximizing, moving, and/or changing the dimensions or the individuals panes, may be provided as typically found in a windows environment.

A pointer 260 may be provided to facilitate user interaction. For example, the user may use a mouse, joystick, light pen, roller-ball, keyboard, or other peripheral devices for manipulating the pointer 260 over the graphical user interface 200. Further, the pointer 260 may permit the user to navigate between the menu bar 210, the tool bar 220, and each of the panes 230, 240, 250 of the graphical user interface 200, as well as to select features and options from among various menus, “pop-up” windows, icons, prompts, etc.

In some implementations, the pointer 260 may display location-specific and/or context-specific action menus, in response, for example, to the user hovering or right clicking on a certain pane or location of the graphical user interface 200. The pointer 260 may be, for example, an icon or other indicia, such as an “arrow”. In some implementations, the user may be permitted to change the pointer 260 icon, for example, through the Preferences menu of the menu bar 210. As will be appreciated, the pointer 260 may readily permit other functionality. The pointer 260 may be configured to execute operations, for example, when the user right- or left-clicks a mouse. In some implementations, when the user moves the pointer icon 260 to a different pane or location within the graphical user interface 200, its design and/or functionality may change.

Figure 2A:
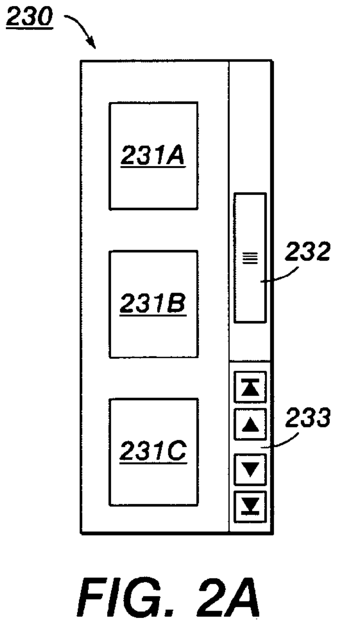
FIG. 2A, shows an exemplary preview pane of the graphical user interface.

As shown in FIG. 2A, an exemplary preview pane 230 may display a plurality of “thumbnail” or smaller representative images 231A, 231B, 231C of the pages of the print job. Each page of the print job, preferably, will have a separate thumbnail image. A scroll feature 232 and may be provided along the right side (or other locations) of the preview pane 230 to allow the user to quick peruse through the thumbnail images 231A, 231B, 231C. Similarly, a navigation feature 233 may be provided that permits the user to flip to the first page, the previous page, the next page, or the last page of the print job.

In response to a user selecting a particular thumbnail image, for example, using pointer 260, the page of the print job corresponding to the user-selected thumbnail image may displayed in the active pane 240 of the graphical user interface.

Figure 2B:
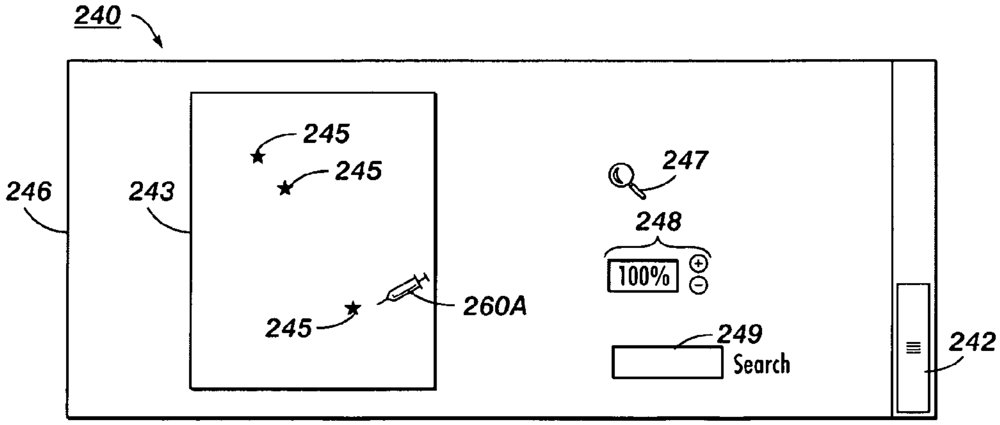
FIG. 2B shows an exemplary active page pane of the graphical user interface.

FIG. 2B shows an exemplary active page pane 240 of the graphical user interface 200. At least a portion of the active page is displayed generally at 243. A scroll mechanism 242 may be provided to permit the user to navigate to other locations of the page that may not be currently displayed. Within the active page 243, the design of the pointer 260 may change, for example, to “syringe” icon 260A. This signifies to the user, that a user may select or extract critical colors within the print job.

A marker 245 may be displayed at each of user-selected points on the active page 243, as points are selected by the user. The marker 245 may be any indicia or icon that designates a selected-point. While the marker 245 is shown being a small “star”, in the figure, it will be appreciated the marker may be a “square,” “circle,” “push-pin,” “bulls-eye” icon or any other indicia. In some implementations, the user may have the option to change the marker indicia (e.g., from a plurality of icons) or to create, edit, or upload other images or icons. Further, in some implementations, additional information, related to its entry in critical color log 251 (FIG. 2D) may be briefly displayed, for example, when a user hovers over a marker, clicks the mouse on a marker, touches the marker, or other similar actions with the pointer 260A (260).

The active page pane 240 may include an additional tool bar 246 to help the user in selecting critical colors. In one implementation, the tool bar 246 may include, a magnify feature 247, a zoom feature 248, and a search feature 249. Other features and options may similarly be provided.

The magnify feature 247 permits the user to magnify and more clearly display a particular region of the active page 243. In some implementations, the magnify feature 247 may change the design of the pointer 260 to a “magnifying glass” to permit the user to view the image on a pixel-by-pixel basis to aid in color selection.

Similarly, a zoom feature 249 may permit the user to “zoom-in” and “zoom-out” relative to the currently sized document, by pressing, for example, the plus and minus buttons. A search window 249 may be provided to permit the user to search for specific context in the active page 243 (or other pages of) the print job. The user may input a simple search query (e.g., a text word or words) in the query box, and press “search.” In response, the user may be navigated directly to the occurrence(s) within the active pages (or other pages) print job.

In some implementation, depending on a color sensing device (FIG. 3: 370) which may be provided in the printing system, the whole width of the document may not be able to be measured. This may be especially true for strip or point spectrophotometer. As such, according to one implementation, the graphical user interface may “block” out certain area in which critical colors cannot be measured.

Figure 2C:
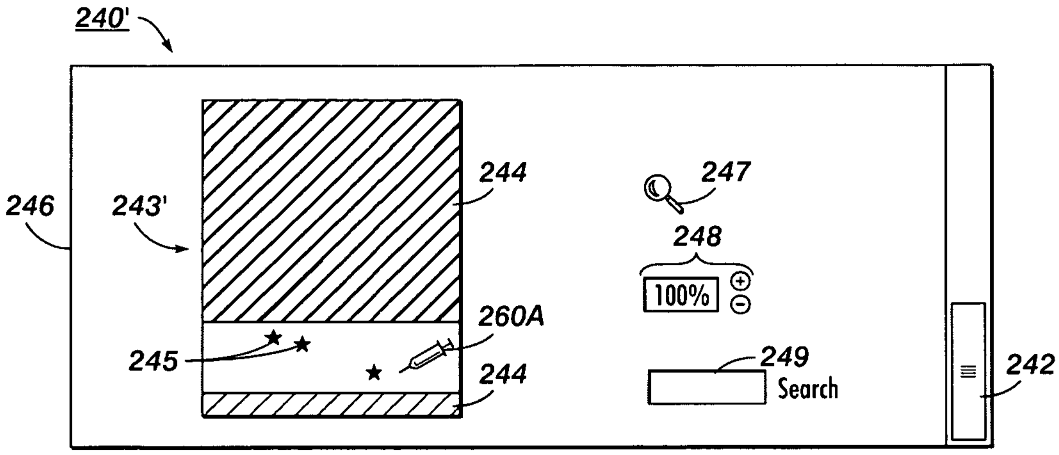
FIG. 2C shows an exemplary active page similar to FIG. 2B, having "blocked out" region(s) to indicate to the user that no critical colors may be selected in these regions.

FIG. 2C shows an exemplary active page pane 240' having an active page 243', similar to the one shown in FIG. 2B. However, one or more “blocked out” regions 244 may be provided to indicate to the user that no critical color may be selected in these regions. In some implementations, the user may provide details regarding the effective boundaries of the color sensing device, which may be used for this purpose. In other implementations, this data may be retrieved from a remote server.

Figure 2D:
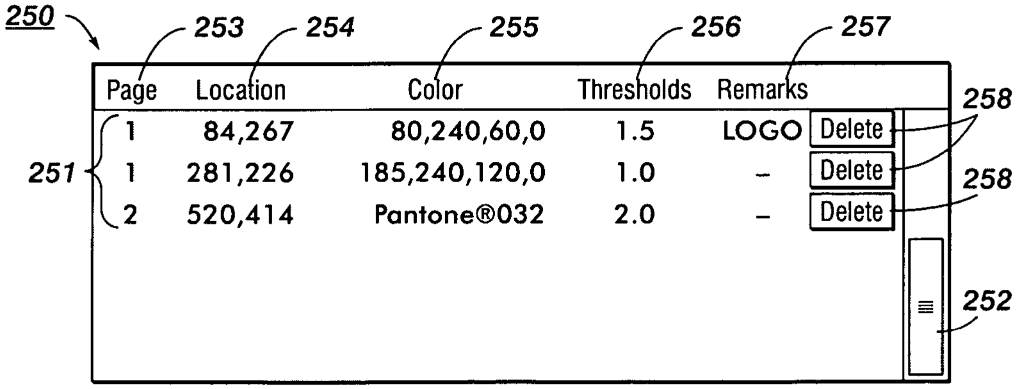
FIG. 2D shows an exemplary critical color log pane of the graphical user interface.

FIG. 2D shows an exemplary critical color log pane 250 of the graphical user interface 200. Information regarding user-selected critical colors may be displayed in a critical color log 251, for example, in a tabular manner. A scroll feature 252 may be provided along the right-hand side (or other locations) of the critical color log pane 250 to allow the user to more quickly peruse through entries in the log 251. The critical color data may include the page number 253, location on that page 254, color data 255, threshold values 256, for each user-selected points. Additionally, the log 251 may provide for user-inputted remarks 257 regarding the critical color.

The page number 253 may simply be the page of print job that the user selected a point of. For example, for the first entry, the page number is 1.

The location on that page 254 may be determined from the x- and y-coordinates with respect to the upper left-hand corner (or other point) on the page, and may be measured, for example, in inches (in), millimeters (mm), dots, pixels, etc. For example, for the first entry, the location is 84 pixels to the right and 267 pixels below the left-hand upper corner of the page.

The color data 255 may be represented in terms of the constituent process colors according to the color space model (e.g., CYMK, RBG, L*a*b* space, etc.). For example, for the first entry, the color data is 80 (C), 250 (Y), 60 (M), 0 (K). In some implementations, the color selection module 130 may use the input image data for a single pixel. Color data may be provided on a pixel-by-pixel basis from the input image data for the print job. It may be may be difficult for a user to select a single pixel using a mouse, touch screen, or other pointing device. As previously discussed, the magnification features 247 and zoom features 248 may facilitate the user doing so.

In addition, the color data may enable using spot color information data. For example, the application may recognize a user-selected critical color as matching (and/or being substantially similar) to a known spot color (see FIG. 2E). Based on the user’s response, either the spot color information data or the input image data for the selected point will be used.

Spot colors may require conversion to other color spaces, or vice versa, for comparison. For example, for the third entry the color data is Pantone®032. Rather, than using the input image data for this critical color, spot color information data corresponding to the Patntone® spot color may be used instead.

Based on the user's response, either the spot color information data or the input image data for the critical color will be used.

Delete options 258 may be provided for deleting entries in the critical color log 251 that may have been erroneous selected or entered by the user, and/or are no longer desired by the user. As will be appreciated from the foregoing, the user is given great flexibility in selecting one or more critical colors within a document.

Color threshold values 256 may be color difference thresholds that the measured color should be within relative to the target color value for that critical color. If not, additional action may be performed. In one implementation, color difference thresholds could be a single setting, or different thresholds could be applied to specific colors. Similarly, different actions could be taken for different threshold levels, or for thresholds being exceeded on different colors. For example, for the first entry, the color threshold is set at 1.5 delta-E. In some implementation, the color threshold values 256 may be user-inputted. Alternatively, default settings may be used.

Figure 2E:
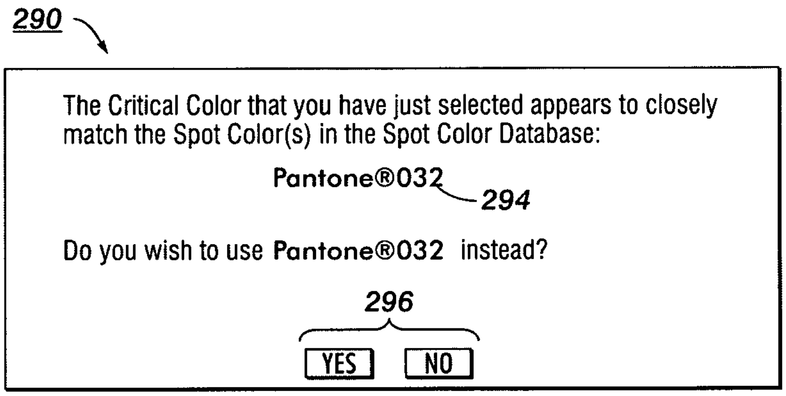
FIG. 2E shows an exemplary "pop-up" prompt that may be displayed to the user if a user-selected critical color corresponds to a spot color.

FIG. 2E shows an exemplary "pop-up" prompt 290 that may be displayed to the user if a user-selected critical color corresponds to a spot color 294 found in one or more of the spot color databases 135. Confirmation options 296 may be provided for the user to use the spot color data rather than the input image data. In some implementations, if more than one spot color may be related to the user-selected critical color a scroll menu be may be provided to allow the user to select one of the displayed spot color.

The application 100 may be configured to handle variable information (VI) as part of a variable data job. For example, in printing a direct mail advertisement the body of the advertisement will be the same for all recipients, but the header which includes an individual recipient's name and address, the name and address for each copy would be in a "VI record." See, for example, U.S. Pat. No. 6,446,100, herein incorporated by reference in its entirety. The job might consist of a single advertisement body, and a large number of VI records (one for each recipient). For variable data jobs, the user can choose to have a representative VI record displayed in the previewed image. In other implementation, the first representative VI may be displayed in the previewed image by default.

According to another aspect of the application, a system is provided with a color sensing device to automate the measurement of printed documents during production of a print job.

FIG. 3 shows an exemplary schematic for a printing system architecture 300, according to one embodiment of the application. The system 300 may advantageously handle the automatic printing and monitoring critical colors.

Customer documents may be sent to a print controller 310, for example, through a network interface and/or user interface (UI) 312. The print controller 310 is used to manage print devices e.g., color laser printers, production printers, and digital presses, especially in high-volume environments. In one embodiment, the print controller 310 may be a Digital Front End (DFE).

Image content in digital forms (i.e., a data file) is accepted, stored, produced, decomposed or otherwise presented at the print controller 310. The print controller 310 accepts content for images desired to be printed in any one of a number of possible formats, such as, for example, TIFF, JPEG, or Adobe® PostScript®. This image content is then "interpreted" or "decomposed" in a known manner into a format usable by the marking engine controller (or multiple marking engine controllers in a TIPP system). The print controller increases productivity by efficiently automating digital workflow.

Typically, the print controller 310 is an external device, such as a computer or server, that interfaces to a network and typically will accept image content and process the image content for a copier or printer devices. However, the print controller 310 may be a part of the printing device itself. For example, the Xerox® iGen3® digital printing press may incorporate a print controller. Alternatively, the iGen3® may also enable use of third party controllers. By having knowledge of each pixel individually, the print controller can process each pixel of the image content more intelligently.

The print controller 310 may receive the input image data for customer documents via a network (or alternatively through an attached scanner). The print controller 310 identifies the objects types and their locations on the customer documents that will be printed. The object types and their locations on the customer documents may be identified by the print controller 310 using image analysis software, as described above.

The print controller 310 sends both the image data from the image, and the control information to a planner/scheduler 320. In other embodiments (not shown), the image content may be sent to the marking engine 330 directly at the direction of the planner/scheduler 320. All of this depends on the specific architecture of the printer system 300, print controller 310, planner/scheduler 320, and/or marking engine 330, and thus may be varied.

The print controller 310 may include a raster image processor (RIP) 314 that accepts an input Page Description, for example, as described by a page description language (PDL), such as PostScript, and produces a bitmap. Generally, for graphics and text, the color representation in PostScript is 'real,' or floating point, and is represented in 32 or 64 bits. For objects that are images (e.g., a JPG file), they are generally 8 bits per color separation, but can also be 12 or 16 bits (though this is not as common). Where the PDL of the incoming image data is different from the PDL used by the printing system, a suitable conversion unit (not shown) located in the interface unit may convert the incoming PDL to the PDL used by the digital printing system.

The bitmap is then passed to an image output terminal (IOT) interface 316. The IOT interface 316 may further perform image processing to make corrections or compensation to correct for deviations in the printing process. Grayscale image data, for example, may be provided to the IOT interface 316 because binary data cannot be easily image processed, without more complicated image processing to convert it back to something like grayscale. Although, it will be appreciated that other printer architectures are also possible, such as IOTs that have binary image data interfaces, as well as some that have contone image interfaces.

The planner/scheduler 320 schedules the printing of each of the pages of the document. While the planner/scheduler 320 is shown being separate from the print controller 310, in some implementations, the planner/scheduler 320 may be a part of the print controller 310.

The planner/scheduler 320 forwards the input image data to the marking engine controller 330 for printing along with image data, critical color information and control information. The control information may include a map of the page along with object types and their locations on the page. The marking engine 330 is constructed to print images of a document.

The marking engine 330 generally operates at a constant speed. Although, it will be appreciated that different areas within the printing device may run at different speeds, with acceleration and deceleration zones bridging areas running at different speeds. For example, it is known to slowdown the process speed during fusing to achieve better image fix, while running the rest of the paper path at higher speeds to maintain overall throughput. A media handling subsystem (not shown) delivers a sheet of media to the marking engine 330 at a precisely specified time window for printing. Generally, the print media will be a sheet of paper, although it will be appreciated that various paperstock or other print media types may advantageously be used, alternatively, or in addition to paper.

The marking engine 330 may be a color xerographic printing system. However, it will be appreciated that the marking engine 330 may be readily adapted for other kinds of printing technology, such as, for example, ink-jet (bubble jet), laser, offset, solid-ink, dye sublimation, etc.

After being printed with the marking engine 330, the printed images 340 proceed along an output media path 350 toward the output destination/finisher 390. Located between the marking engine and the output destination/finisher 390 is a color sensing device 370. Printed customer documents 340 continue on the output media path 350 to the output destination/finisher 390.

The color sensing device 370 provides sensing and analysis of the printed customer documents 390. The color sensing device 370 may comprise a color measuring device and associated color analyzer for processing the sensed image data obtained by the measurement device. The color sensing device 370 provides high quality scanning of at least a portion of a page. In one implementation, an embedded or inline spectrophotometer (ILS) may be used. A spectrophotometer is a photometer that can measure intensity and wavelength of light. It will be appreciated that in other embodiments, the color sensing module may be a calorimeter, a densitometer, or a spectral camera. In one implementation, the color sensing module may be a point sensor, which scans only a small portion of the width of the printed sheet. In other implementations, the scanning module may be a full-width array sensor which is configured to scan the entire width of the printed sheet.

The color sensing device 370 produces raw data for the printed customer documents 340 corresponding to the location information included in the critical color information.

A color analyzer associated with the color sensing device 370 may be a separate processor for analyzing one or more image quality parameters related to color (e.g., CIE (L*a*b color space), color difference (e.g, Delta-E), reflectance at specific wavelengths, etc.). L*a*b* is a three-dimensional color space where L* is the luminance of the sample, and a* and b* are the color components of the sample. If a* and b* are both zero, the result is a neutral color.

Algorithms are known for converting process colors (e.g., CYMK, RGB) values to L*a*b color space, and back.

The color sensing device 370 is advantageously much more sensitive than the human eye and may discern non-uniformities and defects well before a person (i.e. the customer) may be capable of doing so. It will be appreciated that other characteristics and/or parameters that would be recognizable or objectionable to the customer, which may be readily determined or measured, may advantageously be measured and analyzed as well.

The difference between the measured color (L2*a2*b2) and the target color values. (L1*a1*b1) may be determine according to equation (1) as follows:

$$dE^2=(L1-L2)^2+(a1-a2)^2+(b1-b2)^2 \quad (1)$$

The resulting number is scalar and is referred to as Delta-E or the color difference. It will be appreciated that other color difference algorithms might similarly be used.

The color analyzer may perform a comparison on a pixel-wise (i.e., a pixel-by-pixel basis) and/or by a location. The color analyzer may also perform other imaging processing on the printed documents (e.g., filtering), if desired.

In some implementations, the color analyzer may be used to determine not just a certain problem (i.e. a certain parameter exceeds a certain threshold), but that a parameter is consistently getting worse. For example, many non-uniformities may not be currently be at the level to require action, but over time may be increasing in frequency and/or intensity. According to one aspect of the application, the history of these measurements may be maintained in a log on the machine, and/or transferred remotely so they are made available to a Customer Service Engineer (CSE) for service. As such, the color analyzer may identify trends, in addition to specific defects and non-uniformities. This may trigger maintenance and/or repair action. Optionally, the system may request a reprint of any pages if a desired parameter is not achieved.

The output destination/finisher 390 may include one of a plurality of output destinations, or output trays. In one embodiment, one or more of the output trays may be used as a purge tray. The output destination/finisher 390 may also perform final collating of the pages of the document. As is known in the art, the finisher can include any post-printing accessory device such as a sorter, mailbox, inserter, interposer, folder, stapler, stacker, hole puncher, collater, stitcher, binder, envelope stuffer, postage machine, or the like.

The color sensing device 370 may provide feedback 375 to the print controller 310 based on the printed customer documents 340. The difference between the printed critical color (e.g., what was actually printed) and the input critical color information (e.g., what should have been printed) may be used for various purposes.

The print controller 310 may generate an error signal indicating to the user or operator that a failure has occurred and that a desired parameter is not achieved.

Moreover, the print controller 310 may modify the process controls parameters of the marking engine 330 to compensate for variations and inconsistencies in the output image, and/or to generate error signals. In some implementations, the process controls parameters of the marking engine 330 may be automatically adjusted to compensate for variations and inconsistencies in the output image. Such process control parameters may include, but are not limited to, one or more of the following: fuser roll temperature, dwell time in the fuser roll nip, process speed, additional heat energy supplied, nip width of the fuser roll nip and pressure on the fuser rolls. In additional, other printing control parameter may similarly by adjusted. For example, in a xerographic printing system, development voltages and/or transfer currents may be adjusted as well.

Figure 4:
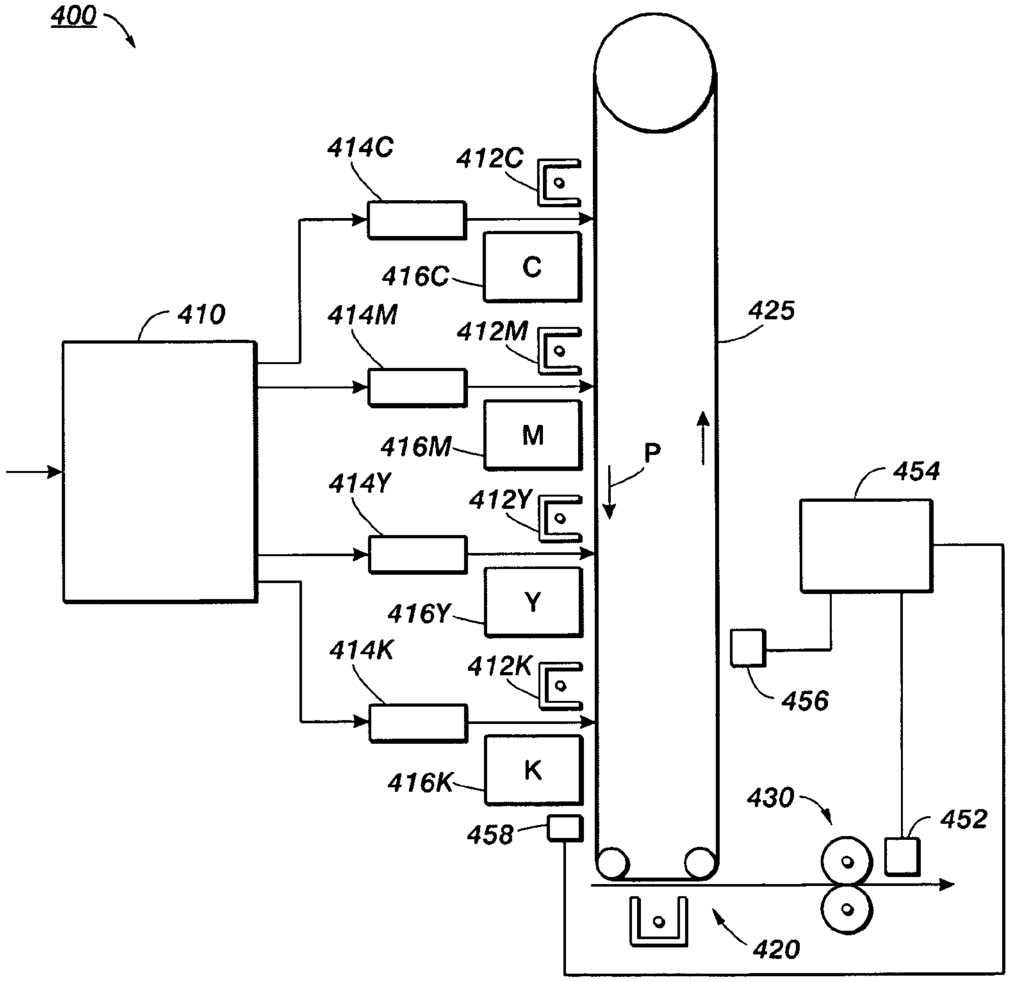
FIG. 4 shows an exemplary printing system, according to an embodiment of the application.

FIG. 4 shows an exemplary printing system, according to an embodiment of the application.

Specifically, there is shown an "image-on-image" xerographic color printer, in which successive primary-color images are accumulated on a photoreceptor belt, and the accumulated superimposed images are in one step directly transferred to an output sheet as a full-color image. In one implementation, the Xerox® iGen3® digital printing press may be utilized.

However, it is appreciated that any printing machine, such as monochrome machines using any technology, machines which print on photosensitive substrates, xerographic machines with multiple photoreceptors, or ink-jet-based machines, can beneficially utilize the present disclosure as well.

Specifically, the FIG. 4 embodiment includes a belt photoreceptor 425, along which are disposed a series of stations, as is generally familiar in the art of xerography, one set for each primary color to be printed. For instance, to place a cyan color separation image on photoreceptor 425, there is used a charge corotron 412C, an imaging laser 414C, and a development unit 416C. For successive color separations, there is provided equivalent elements 412M, 414M, 416M. (for magenta), 412Y, 414Y, 416Y (for yellow), and 412K, 414K, 416K (for black). The successive color separations are built up in a superimposed manner on the surface of photoreceptor 425, and then the combined full-color image is transferred at transfer station 420 to an output sheet. The output sheet is then run through a fuser 430, as is familiar in xerography. Printing process may be controlled, for example, by a print controller 410.

As is familiar in the art of "laser printing," by coordinating the modulation of the various lasers with the motion of photoreceptor 425 and other hardware (such as rotating mirrors, etc., not shown), the lasers discharge areas on photoreceptor 425 to create the desired printing, particularly after these areas are developed by their respective development units 416C, 416M, 416Y, 416K.

In one implementations, the color sensing device 370 (FIG. 3) may be placed in the printing device to directly monitor printed critical colors as they exit the device, for example, at location 452. In another implementations, the color sensing device, as described above, can be placed just before or just after the transfer station 425 where the toner is transferred to the sheet, for example, at locations 456, 458 for monitoring colors directly on the photoreceptor belt or other intermediate transfer members. The color sensing device can make measurements of images created on the photoreceptor 425 (such as color sensing devices 456 and 458) or to printed images which were transferred to an output sheet (such as color sensing device 452).

The color sensing devices 452, 456 and 458 provide feed back to a control device 454 for taking action in response to critical color measurements. There may be provided any number of color sensing device placed anywhere in the printer as needed, not only in the locations illustrated.

The information gathered therefrom is used by control device 454 and/or the print controller 410 in various ways to aid in the operation of the printer, whether in a real-time feedback loop, an offline calibration process, a registration system, etc. While the control device 454 are shown in the figure as being separate elements, it will be appreciated that in some implementations, the control device 454 may be a part of the print controller 410.

Figure 5:
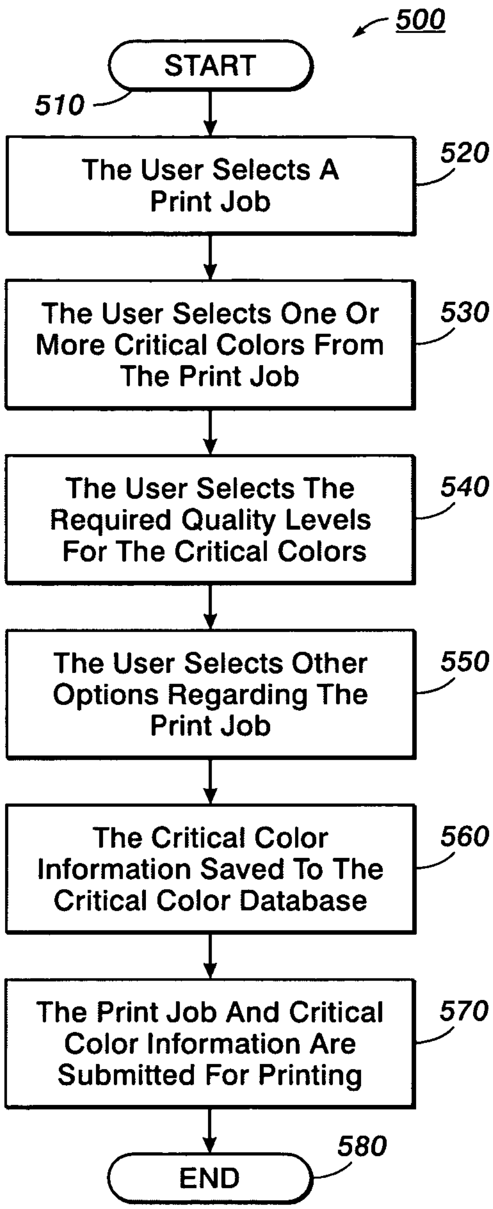
FIG. 5 shows an exemplary method for generating critical color information for user-selected critical colors, in accordance with an embodiment of the application.

FIG. 5 shows an exemplary method 500 for generating critical color information for user-selected critical colors, in accordance with an embodiment of the application.

The method begins in step 510. In step 520, the user may retrieve a print job. The print job may be stored in a print job manager of a print controller or other location. In one implementation, the print controller may be a digital front end (DFE).

Once the print job is retrieved, in step 530, the user may select one or more critical colors from within the print job, for example, using the critical color selection application 100 (FIG. 1). Ideally the job is presented to the user as a series of print preview images and the user may select various points in the document, for which critical color data is determined. For variable data jobs, the operator can choose to have a representative VI record displayed in the preview images.

The user selects from the preview images one or more critical colors to be included in critical color information. Where the selected colors match a spot colors, spot color information data, for example, from the spot color database 135 may be associated with the user-selected critical color.

In step 540, the required quality level, for example, using a delta-E metric or another color quality scale may be user. The user may select the quality for each of the critical colors individually, or a single predetermined threshold may be used for all critical colors.

Continuing to step 550, the user may selects various aspects regarding printing of the job. For example, the user may select the system reaction to be taken if the measured quality is outside of the specified quality limits (e.g., shutdown, alert user, run an image quality remediation procedure or other action).

In step 560, the critical colors, target critical colors values, and control information, may be saved to the critical color database in step 570.

Next in step 580, the print job is submitted for printing. A color sensing device is provided to measure the colors of the printed critical colors.

If the critical color has no color target in the critical color database, the measured value for that critical color may be stored in the database. On the other hand, if the critical color has a color target in the critical color database, the data read by the color sensing device is compared to that color target. If the difference between the measured value and the color target exceeds the required quality level, the system executes the system reaction. The process ends in step 590.

Figure 6:
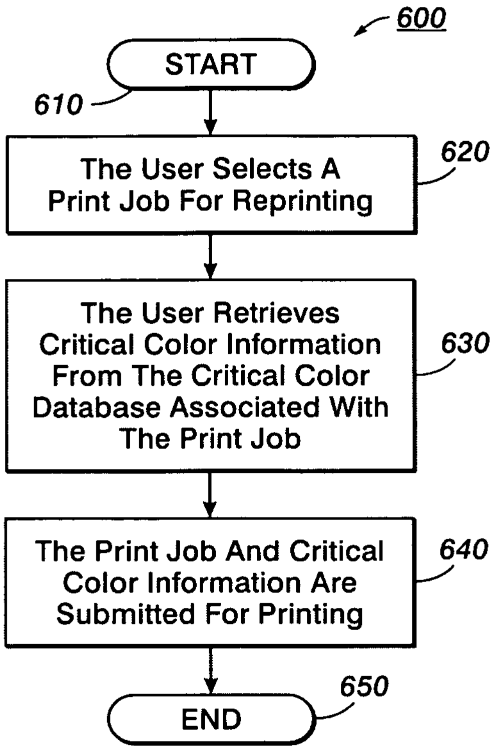
FIG. 6 shows an exemplary method for reprinting a print job using critical colors information associated with the print job, in accordance with an embodiment of the application.

FIG. 6 shows an exemplary method 600 for reprinting a print job using a critical color information associate with that print job, in accordance with an embodiment of the application.

According to this aspect of the application, the critical color information s is stored in the critical color database and associated with the print job for which they were created. The critical color, locations within the document, target color values, and control information may be retrieved with the print job by the user to support reprinting the print job reprint across multiple print systems. As such, consistent color output for critical colors may be ensured for the print job independent regardless of the machine, location, or time when it is printed—using the same critical color information.

The method begins in step 610. In step 620, the user may select a print job for reprinting from the print job manager. The user may be using a different machine, or be at a different location, from where the job was previously printed. However, the print controller may interface with other machines or a remote print server via a network interface/UI.

In step 630, the user retrieves the critical color information, including the critical color, locations within the documents of the critical color, target color values, etc. from the critical color database corresponding to the print job. This may be automatically performed in some implementations, as a result of the user retrieving a print job.

In step 640, the print job, critical color information, and control information are submitted for printing. The process ends in step 650.

The advantage of this approach is that the print controller and/or printing system use the same job-specific critical colors that were identified by a user to establish color target values for how the original print job was (or should have been) printed.

In some implementations, this color target information could be used to setup a target printer for reprinting the print job. For example, when reprinting the job on different machines, these job-specific critical color targets could also be used in selecting candidate printing systems based on the gamut requirements of the critical colors as they were originally printed rather than looking for devices that can match the theoretical gamut of the original printing system.

The applications, systems, and methods, disclosed herein, may also be used in conjunction with a tightly integrated parallel printing (TIPP) system, where multiple marking machines are controlled to output a single print job, for example, as disclosed in U.S. Pat. Nos. 7,206,532; 7,136,616 and 7,024,152, herein incorporated by reference, by their entireties. The applications, systems, and methods may be configured to advantageously monitor color performance and match the performance of each of the multiple print engines in a TIPP system.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A method for monitoring critical color quality for a printing system comprising: selecting a print job; allowing a user to interact with specific areas of the print job and to select one or more critical colors from within the print job to monitor during a print run; printing the print job including one or more pages with one or more of the critical colors printed thereon; automatically measuring the one or more printed critical colors to determine the actual color or colors printed; and executing specific system action in response to the measuring; determining target color values for each of the one or more critical colors; comparing each measured printed critical color to the target color value of the critical color; and determining whether the difference between each measured printed critical color and the target color value of the critical color is within a predefined threshold value; executing specific action in response to said measurement, wherein the specific action comprises one or more of: alerting the user, shutting down the printing system, or automatically invoking corrective action; wherein the critical colors are originally in the print job.

2. The method according to claim 1, further comprising: presenting the user with preview images for the print job; and receiving a selection from the user for each of the one or more critical colors.

3. The method according to claim 2, further comprising: receiving a selected point in said preview images from the user; and determining from the print job a critical color corresponding to said selected point.

4. The method according to claim 3, wherein determining a critical color corresponding to said selected point comprises: using input image data for the print job for said critical color.

5. The method according to claim 3, wherein determining a critical color corresponding to said selected point comprises: determining whether the critical color matches a spot color; and if so, using spot color information data for said critical color.

6. The method according to claim 1, wherein the color measuring comprising using sensing device comprising one of: a spectrophotometer, a colorimeter, a densitometer, or spectral camera.

7. The method according to claim 1, further comprising: saving the critical color information and target color values to a critical color database.

8. The method according to claim 7, wherein the critical colors information is associated with the print job in the critical color database.

9. The method according to claim 8, further comprising: retrieving the critical color information and target color values from the critical color database; and reprinting the print job so as to ensure the print job's critical colors in subsequent print runs accurately match those in the original print run.

10. The method according to claim 2, wherein presenting the user with preview images for the print job comprises: presenting the user with a plurality of thumb nail image for the print job; and receiving a user-selected thumb nail image.

11. The method of claim 1, wherein the one or more critical colors are selected from an image of the print job.

12. The method of claim 1, wherein the one or more critical colors are selected from a page of the print job.

13. The method of claim 1, wherein the one or more critical colors are selected from one or more pixels of the print job.

14. A system for monitoring critical color quality for a printing system comprising: an application for allowing a user to interact with specific areas of a print job and to select one or more critical colors from within the print job to monitor during a print run; a marking engine for printing the print job including one or more pages with one or more of the critical colors printed thereon; a color sensing device for automatically measuring the one or more printed critical colors to determine the actual color or colors printed; and a controller for determining target color values for each of the one or more critical colors, comparing each measured printed critical color to the target color value of the critical color, determining whether the difference between each measured printed critical color and the target color value of the critical color is within a predefined threshold value, and executing specific action in response to a measurement of at least one printed critical color; wherein the specific action comprises one or more of: alerting the user, shutting down the printing system, or automatically invoking corrective action; wherein the critical colors are originally in the print job.

15. The system according to claim 14, wherein the color sensing device comprises one of: a spectrophotometer, a colorimeter, a densitometer, or spectral camera.

16. The system according to claim 14, further comprising: a critical color database for storing the critical color information and target color values.

17. A non-transitory machine-readable storage medium having machine-implemented instructions, executable by a processor, for allowing a user to interact with specific areas of a print job and to monitor critical color quality for a printing system, comprising: a graphical user interface module for generating a graphical user interface (GUI) on a display device and to interact with specific areas of a print job; a preview module for presenting the user with preview images for the print job; a critical color selection module for receiving a selection from the user of one or more critical colors within the print job; a critical color module for maintaining information related to each of the critical colors; and an action response module for determining target color values for each of the one or more critical colors, comparing each measured printed critical color to the target color value of the critical color, determining whether the difference between each measured printed critical color and the target color value of the critical color is within a predefined threshold value, and executing specific action in response to a measurement of at least one printed critical color; wherein the specific action comprises one or more of: alerting the user, shutting down the printing system, or automatically invoking corrective action; wherein the critical colors are originally in the print job.

18. The machine-readable storage medium according to claim 17, wherein the preview module generates and displays a plurality of thumbnail images corresponding to the pages of the print job.

19. The machine-readable storage medium according to claim 17, wherein the critical color selection module prompts the user if a user-selected critical color matches a spot colors in a spot color database.

20. The machine-readable storage medium according to claim 17, wherein the critical color information module stores the critical color information and target color values for critical colors in a critical color database.

21. The machine-readable storage medium according to claim 17, wherein the critical color information module receives a selected point in the print job from the user and determines a critical color corresponding to said selected point.

22. The machine-readable storage medium according to claim 17, wherein one or more blocked-out regions are displayed to the user corresponding to boundaries of a color sensing device.

* * * * *